(No Model.)

F. W. JUDD.
KETTLE.

No. 441,421. Patented Nov. 25, 1890.

WITNESSES.
Frank Miller.
Nic J. Bainbridge

INVENTOR.
Fred W. Judd
By his attorneys
Watson + Thurston

UNITED STATES PATENT OFFICE.

FRED. W. JUDD, OF CLEVELAND, OHIO, ASSIGNOR TO THE AVERY STAMPING COMPANY, OF SAME PLACE.

KETTLE.

SPECIFICATION forming part of Letters Patent No. 441,421, dated November 25, 1890.

Application filed January 13, 1890. Serial No. 336,793. (No model.)

*To all whom it may concern:*

Be it known that I, FRED. W. JUDD, a citizen of the United States, residing at Cleveland, in the county of Cuyahoga and State of Ohio, have invented certain new and useful Improvements in Kettles and other Vessels, of which the following is a full, clear, and exact description.

My invention relates to kettles and other analogous vessels.

My object is to provide a kettle with a device which facilitates the tipping or tilting of the kettle when it is desired to pour out its liquid contents, and which will prevent the cover thereof from falling off while this is being done.

To this end my invention consists in the combination, with a kettle or other vessel having an ear near its upper edge, of a wire lever having two substantially-parallel legs, the upper ends of which are hook-shaped, each of said legs having a coil near its middle and a pivot engaging with said ear and passing through said coils, all of which will be hereinafter described, and definitely pointed out in the claims.

Figure 1:
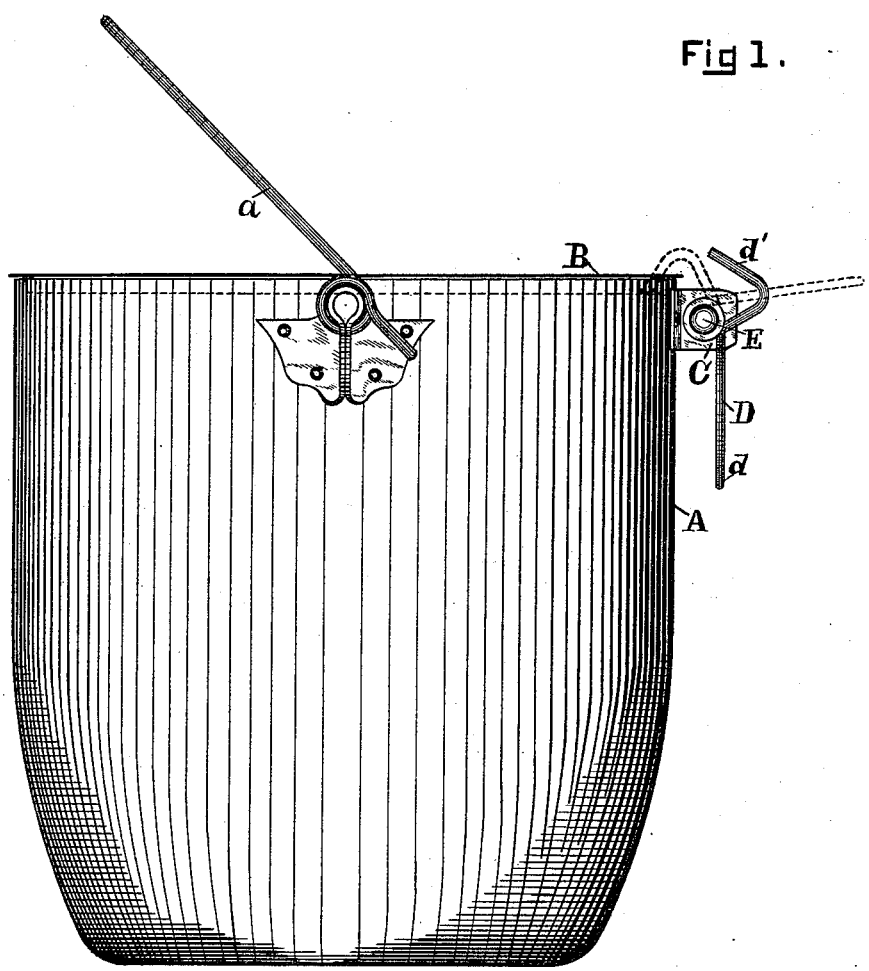
Figure 2:
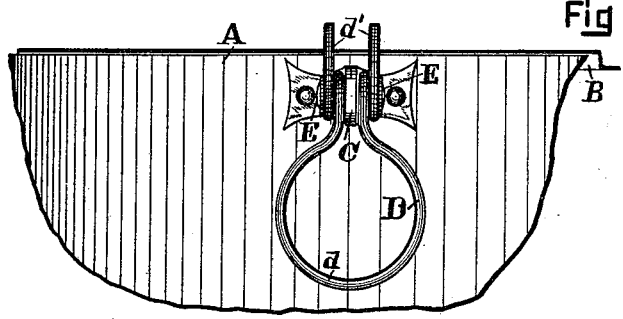

In the drawings, Fig. 1 is a side view of the kettle having my improvement applied thereto. Fig. 2 is a front view thereof.

Referring to the parts by letter, A represents a kettle or any other vessel to which it may be desirable to apply my device.

$a$ represents the bail, secured to suitable ears on the sides thereof, and B represents the cover of the kettle. Midway between the two ears, and near the upper edge of the kettle, is secured an ear C.

D represents a lever formed of wire, which is bent near its middle, substantially as shown, until the two legs are substantially parallel. The upper ends of both legs are bent inward to form a sort of hook $d'$. Near the middle of both legs the wire is looped or coiled, and an arbor suitably secured to the ear passes through these coils and thus pivotally connects the lever with the ear. Normally this lever lies in about the position shown by the full lines in the drawings. When it is desired to empty the kettle without removing the cover, I grasp the kettle-bail in one hand and the lower part $d$ of the lever D in the other and tip the kettle. In doing this the bent arms $d'$ are thrown inward until their points strike the cover B, which is thereby held firmly in place.

The precise embodiment of this invention, shown in the drawing is as follows: A pin E passes through the hole in the ear C and extends to both sides thereof, thereby forming an arbor upon which the lever D turns. This pin E passes through the loops in the lever, and both its ends are upset or headed, thereby holding the parts in the described position.

Having thus described my invention, what I claim as new, and desire to secure by Letters Patent, is—

1. In combination with a kettle or other vessel having an ear near its upper edge, a wire lever having two substantially parallel legs, the ends of which are hook-shaped, each of said legs having a coil near its middle, and a pin engaging the said ear and passing through said coils, substantially as and for the purpose specified.

2. In combination with a kettle or other vessel having an ear near its upper edge, a wire lever having two substantially-parallel legs, the ends of which are hook-shaped, each of said legs having a coil near its middle, and a pivot-pin passing through said coils and ear, substantially as and for the purpose specified.

FRED. W. JUDD.

Witnesses:
LEONARD WATSON,
E. L. THURSTON.